United States Patent
Lee et al.

(10) Patent No.: US 10,360,687 B2
(45) Date of Patent: Jul. 23, 2019

(54) DETECTION AND LOCATION OF ACTIVE DISPLAY REGIONS IN VIDEOS WITH STATIC BORDERS

(71) Applicant: INTEL CORPORATION, Santa Clara, CA (US)

(72) Inventors: Yeongseon Lee, Phoenix, AZ (US); Nilesh A. Ahuja, Cupertino, CA (US); Mahesh Subedar, Chandler, AZ (US); Jorge E. Caviedes, Mesa, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 78 days.

(21) Appl. No.: 15/200,567

(22) Filed: Jul. 1, 2016

(65) Prior Publication Data

US 2018/0005387 A1 Jan. 4, 2018

(51) Int. Cl.
*G06T 7/269* (2017.01)
*H04N 19/182* (2014.01)
*H04N 19/51* (2014.01)
*H04N 19/102* (2014.01)
*H04N 19/14* (2014.01)
(Continued)

(52) U.S. Cl.
CPC ........... *G06T 7/269* (2017.01); *H04N 19/102* (2014.11); *H04N 19/137* (2014.11); *H04N 19/14* (2014.11); *H04N 19/17* (2014.11); *H04N 19/182* (2014.11); *H04N 19/51* (2014.11); *G06T 2207/10016* (2013.01)

(58) Field of Classification Search
CPC ............... G06K 9/4652; G06K 9/4642; G06K 9/00442; G06K 2009/363; G06K 9/00456; G06K 9/6269; G06K 9/00281

USPC ......................................................... 345/428
See application file for complete search history.

(56) References Cited

U.S. PATENT DOCUMENTS

2005/0069209 A1 * 3/2005 Damera-Venkata ........................ G09G 3/007 382/204
2007/0070196 A1 * 3/2007 Caviedes ............. H04N 7/0115 348/97

(Continued)

OTHER PUBLICATIONS

Bovyrin, A. et al., "Fast extraction of scene structure based on gradient runs analysis", IEEE, Image Processing, Proceedings 2002 Intl. Conference on Image Processing, Sep. 2002, vol. 1, pp. 757-760.

*Primary Examiner* — Kimbinh T Nguyen
(74) *Attorney, Agent, or Firm* — Finch & Maloney PLLC

(57) ABSTRACT

Techniques are provided for detection and location of active display regions in videos with static borders. A methodology implementing the techniques according to an embodiment includes extracting features from rows and columns of pixels of a video frame. The features are based on horizontal gradient runs (HGRs) and vertical gradient runs (VGRs). The method also includes detecting one or more static regions of the frame, based on a comparison of differences between the features of the current video frame and features extracted from a previous video frame. The method further includes detecting one or more boundaries of the static regions based on a location of a maximum value of one of the features within the static region, if the maximum value is greater than a boundary detection threshold value. Determination of the active region in the current video frame is based on exclusion of the detected static regions.

21 Claims, 7 Drawing Sheets

(51) Int. Cl.
*H04N 19/137* (2014.01)
*H04N 19/17* (2014.01)

(56) References Cited

U.S. PATENT DOCUMENTS

| | | | |
|---|---|---|---|
| 2010/0157145 A1* | 6/2010 | Dimnik | H04N 7/0122 348/445 |
| 2011/0090242 A1* | 4/2011 | Cote | G06T 3/4015 345/597 |
| 2011/0090370 A1* | 4/2011 | Cote | H04N 5/208 348/237 |
| 2011/0090371 A1* | 4/2011 | Cote | H04N 5/2176 348/237 |
| 2012/0081577 A1* | 4/2012 | Cote | H04N 19/80 348/231.99 |

* cited by examiner

202

204

206

208

208

210

212

DETECTION AND LOCATION OF ACTIVE DISPLAY REGIONS IN VIDEOS WITH STATIC BORDERS

BACKGROUND

Video content can be captured and provided in a variety of source formats, resolutions, and aspect ratios. These include, for example, standard definition (SD), high definition (HD), and video graphics array (VGA) formats, along with aspect ratios of 4:3, 16:9, 1.85:1, and 2.39:1, to name just a few. The format in which such content is stored or transmitted, however, may vary from that of the source or provider. For example, older SD video may be re-broadcast as HD, or widescreen content may be recorded on a DVD, both involving format changes. When formats change, scaling algorithms are employed to scale up (or scale down) the video to the expected target resolution. If the aspect ratios of the source and target are different, scaling of the video to fit the target along one dimension will result in either cropping the scaled image or augmenting the image with blank pixels in the other dimension. The latter approach is typically preferred as it retains the entire source content. Generally, the blank pixels appear as bars, either at the sides of the video (pillar-box format) or at the top and bottom of the video (letter-box format). The region of a video frame displaying the actual content (i.e., excluding the blank pixels) is referred to as the active display region.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Figure 1:
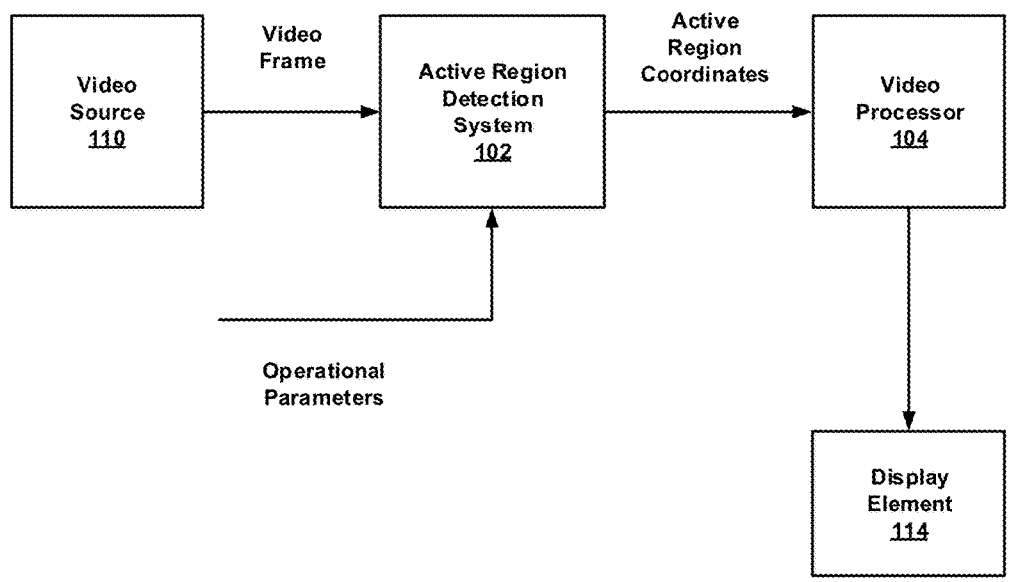
FIG. 1 is a top level block diagram of an implementation of an active region detection system, configured in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

There are a number of non-trivial issues associated when re-broadcasting video content. For example, when standard definition (SD) video is re-broadcast as high-definition (HD), the content provided to the receiving unit (e.g., a television) will already be pillar-boxed. When widescreen content is recorded on a DVD, the content is letter-boxed. In both cases, the content provided to the receiver has already been augmented with black-bars, and unless special processing is added, the receiving unit will process both active and non-active regions alike. Detection of such regions is important because it enables any subsequent video processing algorithm to operate on only the active region while ignoring the blank regions. This helps reduce computational overhead and saves power. Additionally, processing of non-active regions can degrade video quality. Video codec applications, (i.e. encoding and decoding of video) can also benefit from these processing advantages. Knowledge of the active region of video frames can be used prior to encoding, or as feedback to the decoder, to provide the same benefits as with general image processing applications, namely avoiding artifacts due to errors in motion estimation, and processing only the pixels of the active region, thus reducing the workload.

As additional example, automatic contrast enhancement may attempt to compensate for the black bars by brightening the scene, causing undesirable effects. Similarly, algorithms that perform motion-based processing (such as motion-compensated de-interlacing, or motion-compensated frame-rate conversion) can generate undesirable artifacts at black-bar boundaries if the black-bars are considered as part of the content. Furthermore, detection of the active region allows for the actual content to be scaled, filling the entire display and providing an improved user viewing experience, as any black borders are eliminated in the process. Most simple active region detection algorithms, however, assume that the pixels in the blank regions are black in color, which is not always the case. Additionally, such algorithms often incorrectly assume that the blank regions are symmetric with respect to the active region and cannot therefore handle the more general cases. More complex methods to address this problem include motion detection techniques, edge-detection or segmentation techniques, and temporal stability techniques. These methods, however, are generally either insufficient to completely solve the problem, or are so computationally complex as to be infeasible for practical implementation in most applications.

Thus, this disclosure provides techniques for detection and location of active display regions in videos with static borders. As video content is captured, stored, and transmitted, the format and aspect ratio may be modified. For example, the video may be converted from HD to SD, or the aspect ratio may change from 4:3 to 16:9. Scaling algorithms which attempt to fit the video to a target format generally introduce horizontal and/or vertical borders. The borders may be black, grey, or other colors and in some instances may contain logos or other text. In some cases the borders may be asymmetrical. The active display region inside these borders contains the video content of interest, and the disclosed techniques detect this active region and estimate the borders for all such cases. In accordance with an embodiment, the disclosed techniques can be implemented, for example, in a computing system or an image processing system, or a software product executable or otherwise controllable by such systems. The system or product is configured to extract features from rows and columns of pixels of a video frame. The features are based on horizontal gradient runs (HGRs) and vertical gradient runs (VGRs). The system is also configured to detect one or more static regions of the frame, based on a comparison of differences between the features of the current video frame and features extracted from a previous video frame. The system is further configured to estimate one or more boundaries of the static regions based on a location of a maximum value of one of the features within the static region, if the maximum value is greater than a boundary detection threshold value. Determination of the active region in the current video frame is based on exclusion of the detected static regions.

The techniques described herein may provide a number of benefits, as will be appreciated. For instance, some embodiments of the present disclosure allow for reduced computational overhead and improved real-time performance, compared to existing methods, given that only column and row based features are stored and processed for each frame, rather than entire frame buffers, according to an embodiment. Additionally, these techniques can be implemented on a broader range of computing platforms due to the reduced processing and memory requirements. Such platforms may include, for example, a mobile device such as a tablet or smartphone, as well as a television or set-top box. These techniques may further be implemented in hardware or software or a combination thereof.

FIG. 1 is a top level block diagram 100 of an implementation of an active region detection system, configured in accordance with certain embodiments of the present disclosure. A video source 100 is configured to provide a sequence of video image frames, for example, a television show, a movie, or other such video content. In some embodiments, the source 110 may be a broadcasting facility such as a television (TV) station, a cable TV provider, or a satellite TV provider. In some embodiments, the source 110 may be a digital video disc (DVD) player, a video tape player, a video camera, or any other type of video recorder/storage/player device. The video frames are provided to an active region detection system 102 which is configured to detect and define boundaries of non-active and active regions of the video content to be displayed. The active region detection system 102 employs row and column based features which reduce memory requirements compared to existing methods that buffer several entire image frames. The operation of the active region detection system 102 will be explained in greater detail below. In some embodiments, the active region may be defined by pixel coordinates or other suitable indicators. A video processor 104 may be configured to perform further processing on the video frames to enhance the images prior to display on display element 114. The operation of the video processor 104, which may use known techniques in light of the present disclosure, may benefit from the active region boundary detection.

Figure 2:
FIG. 2 illustrates examples of static and active regions in a video frame, in accordance with certain embodiments of the present disclosure.
Figure 2:
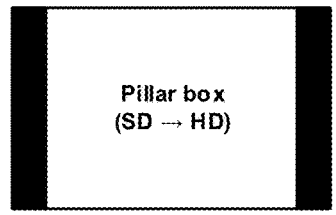
Figure 2:
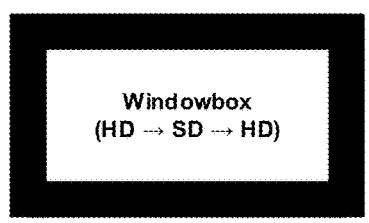
Figure 2:
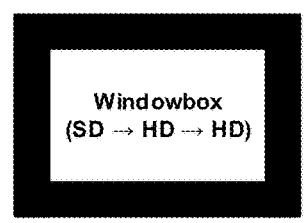
Figure 2:
Figure 2:
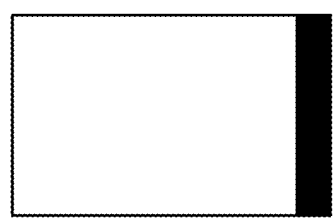
Figure 2:
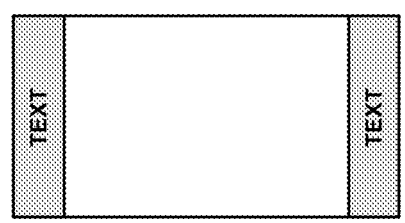

FIG. 2 illustrates examples of static and active regions in a video frame, in accordance with certain embodiments of the present disclosure. The bars associated with non-active regions, at the top, bottom, and/or sides of the video frame, are referred to as black-bars although they are not necessarily black and may, in some cases, contain logos or other static text. A letterbox format 202 is shown, with bars on the top and bottom, which may result from an HD to SD conversion. A pillar box format 204 is shown, with bars on the sides, which may result from an SD to HD conversion. Window box formats 206 and 208 are shown, with bars on the top, bottom, and sides which may result from a combination of conversions between HD and SD. In some situations, the black-boxes may be asymmetrical 208 and may occur as single regions 210. In some additional cases, the black-boxes may have static text or other logos 212. The active region detection system 102 may be configured to correctly process all of these cases, according to an embodiment.

Figure 3:
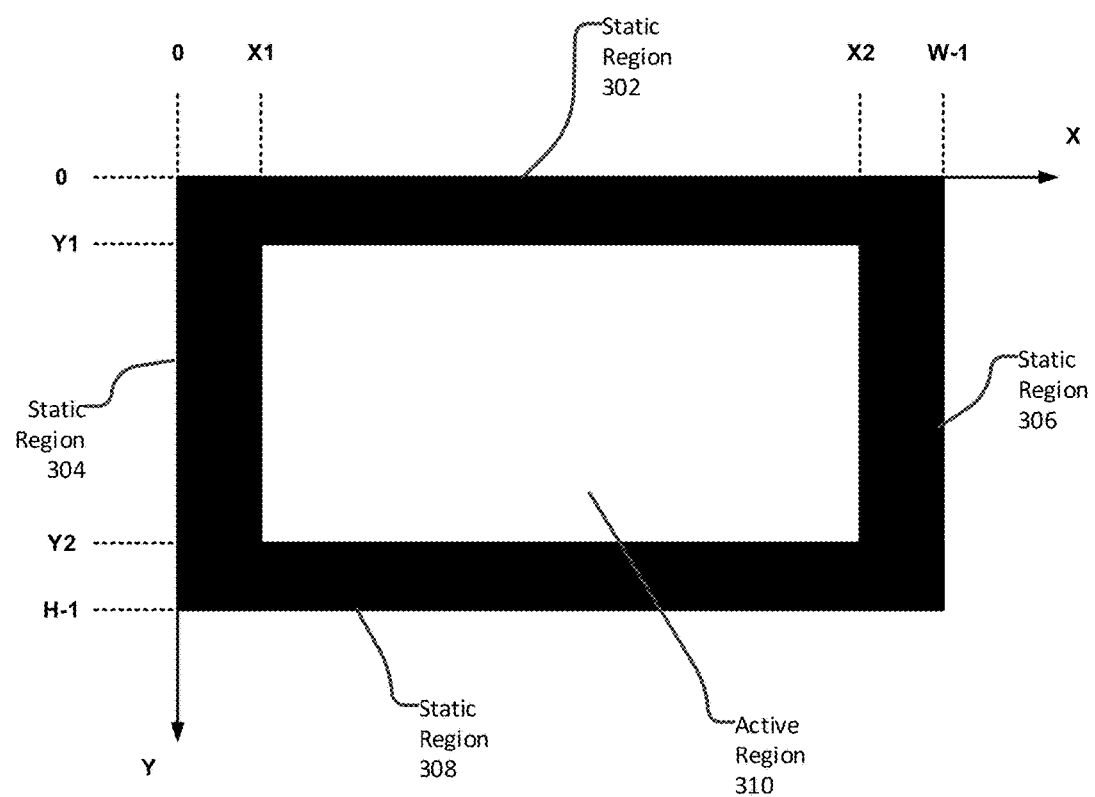
FIG. 3 illustrates coordinates of static and active regions in a video frame, in accordance with certain embodiments of the present disclosure.

FIG. 3 illustrates coordinates of static and active regions in a video frame, in accordance with certain embodiments of the present disclosure. Static regions 302, 304, 306, 308 are shown as black-boxes and the active region 310 is shown as a white area in an x,y coordinate system. The entire video frame has a width W and a height H. In some embodiments, the regions, both static and active, may be defined by the coordinates of the corner pixels. For example, static region 302 may be defined by (0, 0, W−1, Y1) and active region 310 may be define d by (X1, Y1, X2, Y2). If no static regions are detected, then the active region may be defined as (0, 0, W−1, H−1), the entire frame.

Figure 4:
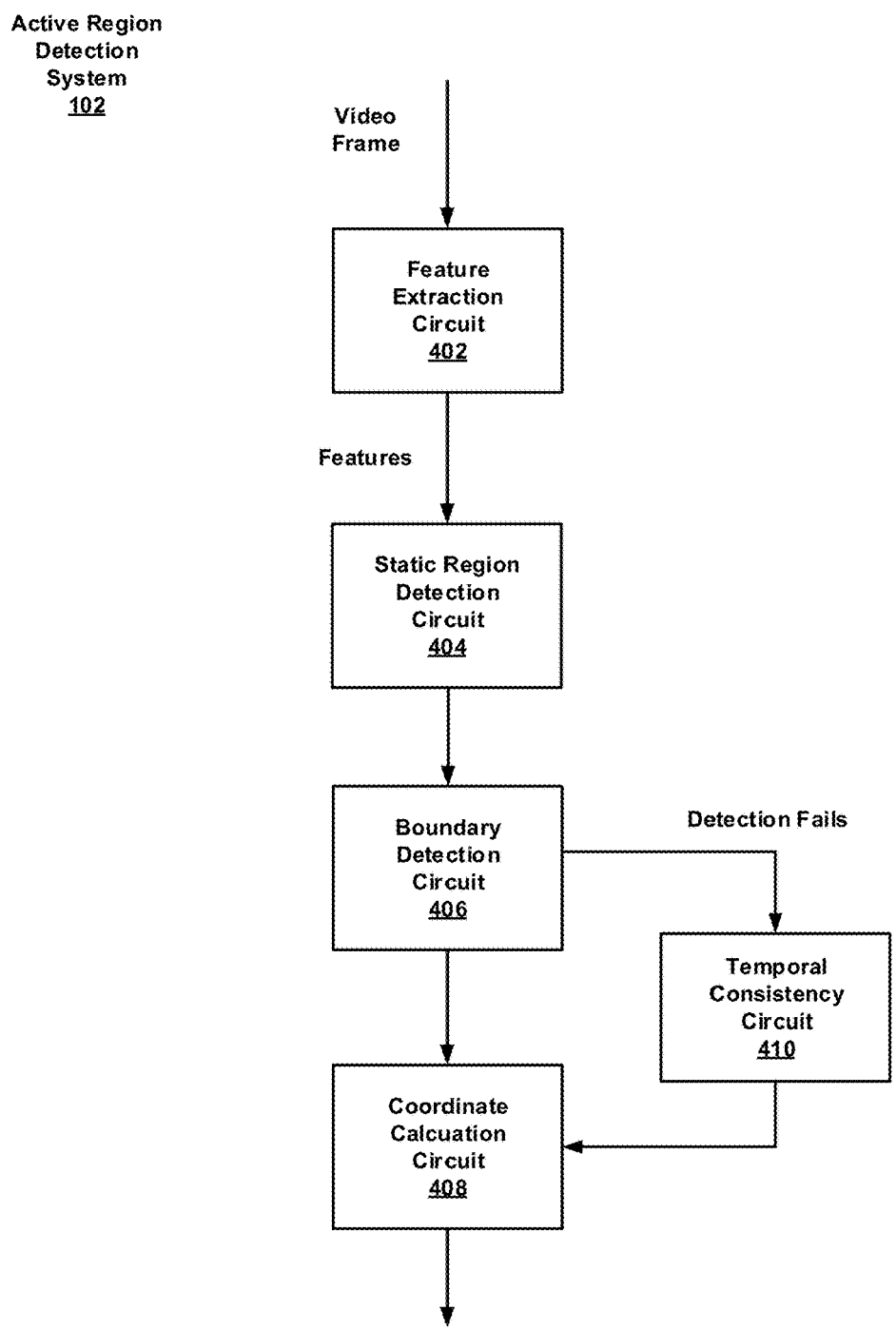
FIG. 4 is a more detailed block diagram of an active region detection system, configured in accordance with certain embodiments of the present disclosure.

FIG. 4 is a more detailed block diagram of an active region detection system 102, configured in accordance with certain embodiments of the present disclosure. The active region detection system 102 is shown to include a feature extraction circuit 402, a static region detection circuit 404, a boundary detection circuit 406, and a coordinate calculation circuit 408. In some embodiments, a temporal consistency circuit 410 may also be provided to handle situations where boundary detection fails. At a high level, the active region detection system 102 is configured to analyze row and column features based on gradient runs, as described below, to detect static regions of the image frame and estimate boundaries. Active-region detection is equivalent to the detection of up to four single, independent black-bar boundaries (e.g., top, bottom, left and right). The process for detection of a single horizontal black-bar boundary is described below. The detection process for vertical boundaries can be similarly described by transposing row operations into column operations and vice versa. Alternatively, the detection process for vertical boundaries can be visualized by rotating the image frame by 90 degrees and then performing the horizontal boundary detection process.

Detection of a horizontal black-bar boundary is based on the following characteristics of black-bar regions. First, luminance variation is generally lower within black-bar regions than in active regions, and thus, horizontal pixel-wise gradients within a black-bar row will typically be smaller than those in active regions. Second, there is a relatively significant luminance change at the boundary between a black-bar region and an active region, and thus, vertical pixel-wise gradients typically exhibit a spike at the black-bar boundary. Third, black-bar regions are static in time so that both pixel values and pixel gradients in black-bar regions will be similar when compared between successive frames.

Figure 5:
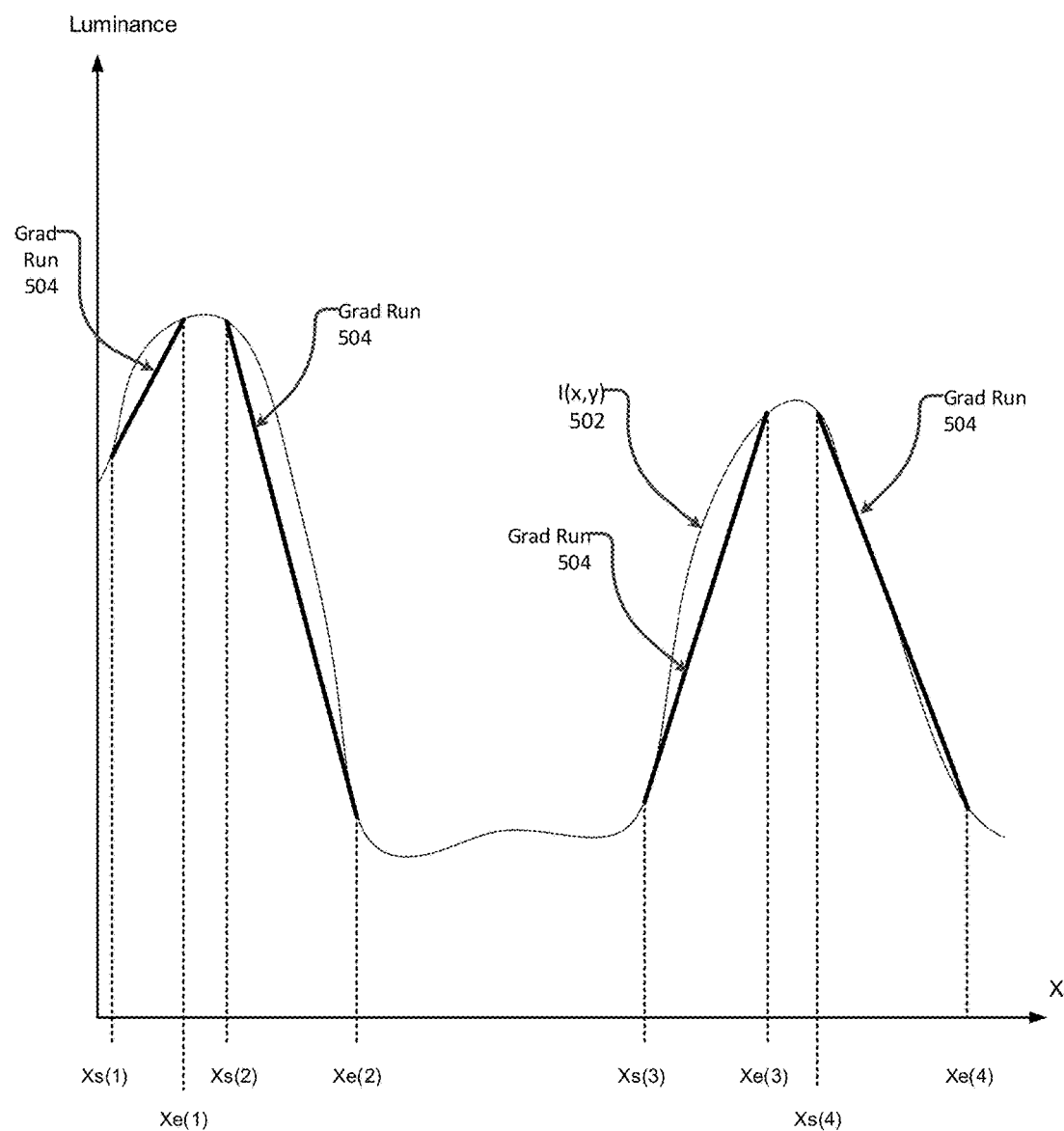
FIG. 5 illustrates examples of gradient runs, in accordance with certain embodiments of the present disclosure.

The feature extraction circuit 402 may be configured to extract features from rows of pixels and columns of pixels of a current video frame. The features are based on horizontal gradient runs (HGRs) and vertical gradient runs (VGRs). A gradient run for a row of pixels (HGR) is defined as:

$$\forall x \in (x_s, x_e) \text{ where } [\forall I_x'>0, I_x'(x,y)>T_1] \text{ or } [\forall I_x'<0, I_x'(x,y)<-T_1],$$

where $I_x'(x,y)$ is the pixel-wise luminance difference in the horizontal direction. In other words, each HGR is a group of consecutive pixels in a row, starting at $x_s$ and ending at $x_e$, for which the differences between each pair of adjacent pixels all have the same sign, and each difference exceeds a delta luminance threshold $T_1$. This is illustrated in FIG. 5, which shows a plot of luminance, $I(x,y)$ 502, along a row of pixels (e.g., constant y). Gradient runs 504 are shown where the slope of the curve 502 exceeds the threshold. A gradient run for a column of pixels (VGR) is similarly defined as:

$\forall y \in (y_s, y_e)$ where $[\forall I_y' > 0, I_y'(x,y) > T_1]$ or $[\forall I_y' < 0, I_y'(x,y) < -T_1]$ Gradient runs capture the locations of edges within an image.

The HGR may be expressed as a quintuple: $(x_s, x_e, y, I(x_s,y), I(x_e,y))$, where $x_s$ and $x_e$ are the starting and the ending coordinates of the gradient run for row y, and I(x,y) is the luminance value at the starting and ending points. In the following description, $x_s$ as referred to as the gradient-run start and $x_e$ as the gradient-run end. Similarly, the VGR may be expressed as $(y_s, y_e, x, I(x,y_s), I(x,y_e))$, where $y_s$ and $y_e$ are the starting and the ending coordinates of the gradient run for column x, and I(x,y) is the luminance value at the starting and ending points.

The first two features to be extracted from the video frame are a count of the number of occurrences of HGR starts and the number of occurrences of VGR starts for each row (i.e., each value of y). These are referred to as HGRS_count(y) and VGRS_count(y), respectively. These row-based features serve as an alternative to pixel based features. It can be seen that HGRS_count(y) will remain relatively constant from one frame to the next for rows within black-bar regions. Furthermore, HGRS_count(y) would typically be lower for rows in black-bar regions compared to rows in active regions, although this might not be true if the black-bar region has logos or other static-text. The VGRS_count(y) feature will exhibit a spike at a black-bar boundary and can therefore be used to estimate the position of the boundary.

Both HGRS_count(y) and VGRS_count(y) will typically remain constant from one frame to the next for static regions. However, in the specific case of a scrolling ticker with perfectly horizontal motion, both of these counts would remain same constant, falsely indicating a static region. To avoid this misinterpretation, in such cases, an additional feature that conveys information about the location of the gradient runs is employed. This third feature is defined as the summation of all the locations of horizontal gradient-run starts in a row:

$$\text{HGRS\_sum}(y) = \Sigma_x x_s(i,y)$$

A fourth feature is an average luminance level, ALL(y), to represent the average of the luminance values of all of the pixels in a row y:

$$\text{ALL}(y) = \Sigma_x I(x,y)$$

This feature may be used to decide whether the frame is bright enough to detect a black-bar.

This collection of features from the current video frame, in addition to the features extracted from the previous frame, is used to detect the black bar (static region) and estimate its boundaries.

The static region detection circuit 404 may be configured to detect static regions of the current video frame, based on a comparison of differences of the HGRS_count(y) and the HGRS_sum(y) features of the current video frame and previous video frame, to a set of static region detection threshold values. This can be expressed in pseudo code as:

```
if ( abs(HGRS_count_t(y) − HGRS_count_{t−1}(y) ) < HGRS_count_threshold and
   abs (HGRS_sum_t(y) − HGRS_sum_{t−1}(y) ) < HGRS_sum_threshold)
     row y is static;
   else
     row y is non static;
``` where t indicates the current frame and t−1 indicates the previous frame.

The boundary detection circuit 406 may be configured to estimate boundaries of the detected static regions based on a location of a maximum value of the count of VGR starts within the static region, if the maximum value exceeds a boundary detection threshold value. In other words, the location of the black-bar boundary is the row-index y corresponding to the maximum value of VGRS_count(y), greater than a predefined threshold, within the detected static region. If no maximum value greater than a threshold is found, an alternative technique is implemented using temporal consistency circuit 410, as described below.

The coordinate calculation circuit 408 may be configured to define an active region in the current video frame, based on exclusion of the detected static regions. The coordinate calculation circuit 408 may further be configured to calculate coordinates to define the detected boundaries of the detected static regions. The coordinates may identify, for example, the top left, bottom left, top right, and bottom right pixels of the regions.

The temporal consistency circuit 410 may be configured to define an alternative static region boundary in cases where the boundary detection circuit fails to estimate a boundary in the current frame. Such a failure might result for two reasons. If the HGRS_count and HGRS_sum values do not meet the threshold checks, there is motion from frame t−1 to frame t and therefore the region is not static, so no boundary should be estimated. However, if the HGRS threshold checks are satisfied but the VGRS check fails, then there is no clear distinction between static region black bar (if any) and active region content. In the latter case, if a boundary was detected in the previous frame, an average is calculated of the red, green, and blue (RGB) pixel values within the static region boundary of the previous video frame. A similar average is calculated of the red, green, and blue (RGB) pixel values within the corresponding region of the current video frame. If the difference between the two averages is less than a threshold value, the static region boundary of the previous frame is assigned to the current frame.

Methodology

Figure 6:
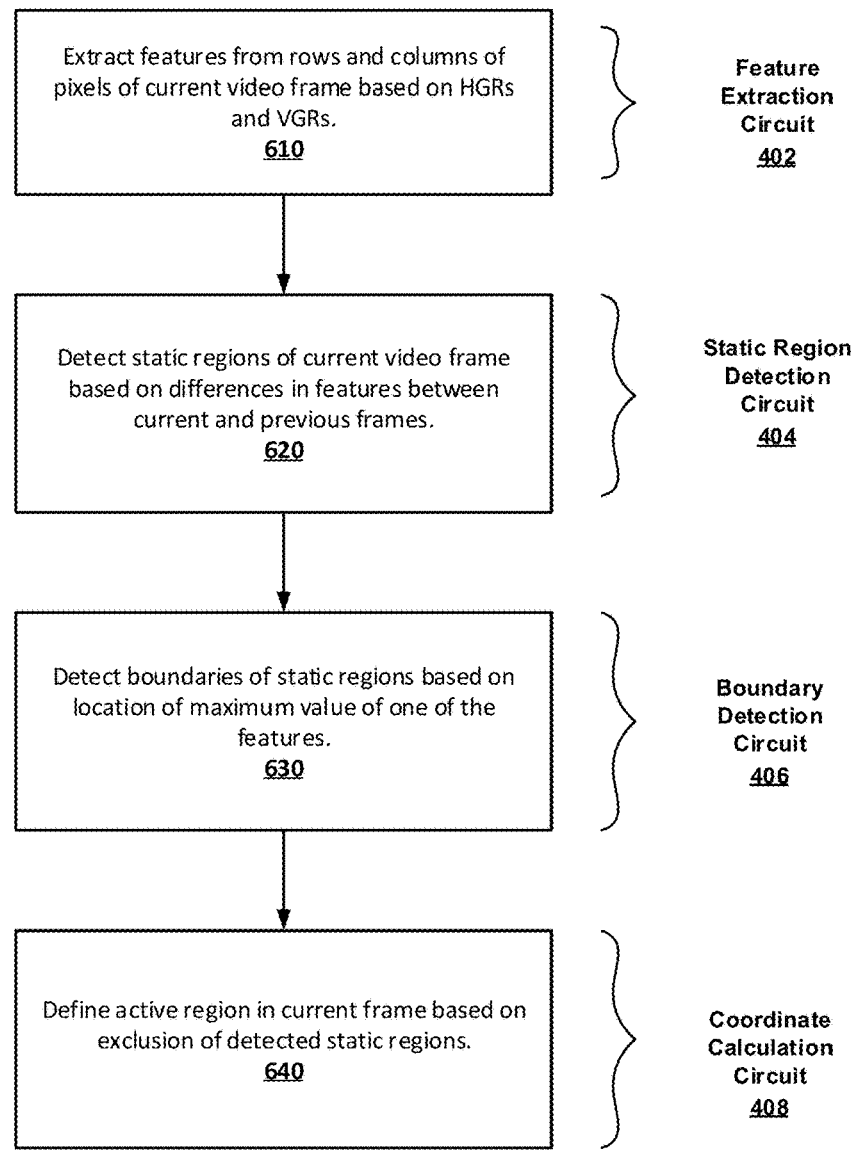
FIG. 6 is a flowchart illustrating a methodology for active region detection of video frames, in accordance with certain embodiments of the present disclosure.

FIG. 6 is a flowchart illustrating an example method 600 for active region detection of video frames, in accordance with certain embodiments of the present disclosure. As can be seen, example method 600 includes a number of phases and sub-processes, the sequence of which may vary from one embodiment to another. However, when considered in the aggregate, these phases and sub-processes form a process for active region detection in accordance with certain of the embodiments disclosed herein. These embodiments can be implemented, for example using the system architecture illustrated in FIG. 4 described above. However other system architectures can be used in other embodiments, as will be apparent in light of this disclosure. To this end, the correlation of the various functions shown in FIG. 6 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module can be used to perform all of the functions of method 600. Thus other embodiments may have fewer or more modules and/or sub-modules depending on the granularity of implementation. In still other embodiments, the methodology depicted can be implemented as a computer program product including one or more non-transitory machine readable mediums that when executed by one or more processors cause the methodology to be carried out. Numerous variations and alternative configurations will be apparent in light of this disclosure.

As illustrated in FIG. 6, in one embodiment, method 600 for active region detection of video frames commences at operation 610, by extracting features from each of the rows and columns of pixels of a current video frame. The features are based on horizontal gradient runs (HGRs) and vertical gradient runs (VGRs), as described previously. HGRs and VGRs identify the pixel locations of relatively strong edges within the rows and columns of an image based on the difference in luminance between pairs of adjacent pixels.

Next, at operation 620, one or more static regions are detected in the current video frame. The detection is based on differences between selected features extracted from the current video frame and corresponding selected features extracted from a previous video frame. If the differences are less than a threshold value, the region is determined to be static (e.g., relatively unchanged from one frame to the next). The selected features for static region detection include a count of the number of HGR starts and the number of VGR starts for each of the rows of pixels and for each of the columns of pixels. The selected features also include a summation of locations of starting points of the HGRs for each of the rows and a summation of locations of starting points of the VGRs for each of the columns.

At operation 630, boundaries of the static regions are detected based on a location of a maximum value of the count of HGR starts and VGR starts within the static region, if the maximum value exceeds a boundary detection threshold value.

At operation 640, an active region in the current video frame is defined based on exclusion of the detected static regions. The boundaries of the static regions and the active region may be defined by coordinates identifying top left, bottom left, top right, and bottom right pixels of these regions.

Of course, in some embodiments, additional operations may be performed, as previously described in connection with the system. These additional operations may include, for example, in response to a failure to detect a static region boundary in the current video frame, carrying over the static region boundary of the previous frame, if an average of RGB pixel values of those regions remain relatively constant between the two frames.

Further additional operations may include calculating the average luminance value of pixels in each of the rows and each of the columns, for example to determine whether the input is bright enough to detect black-bar static regions.

Example System

Figure 7:
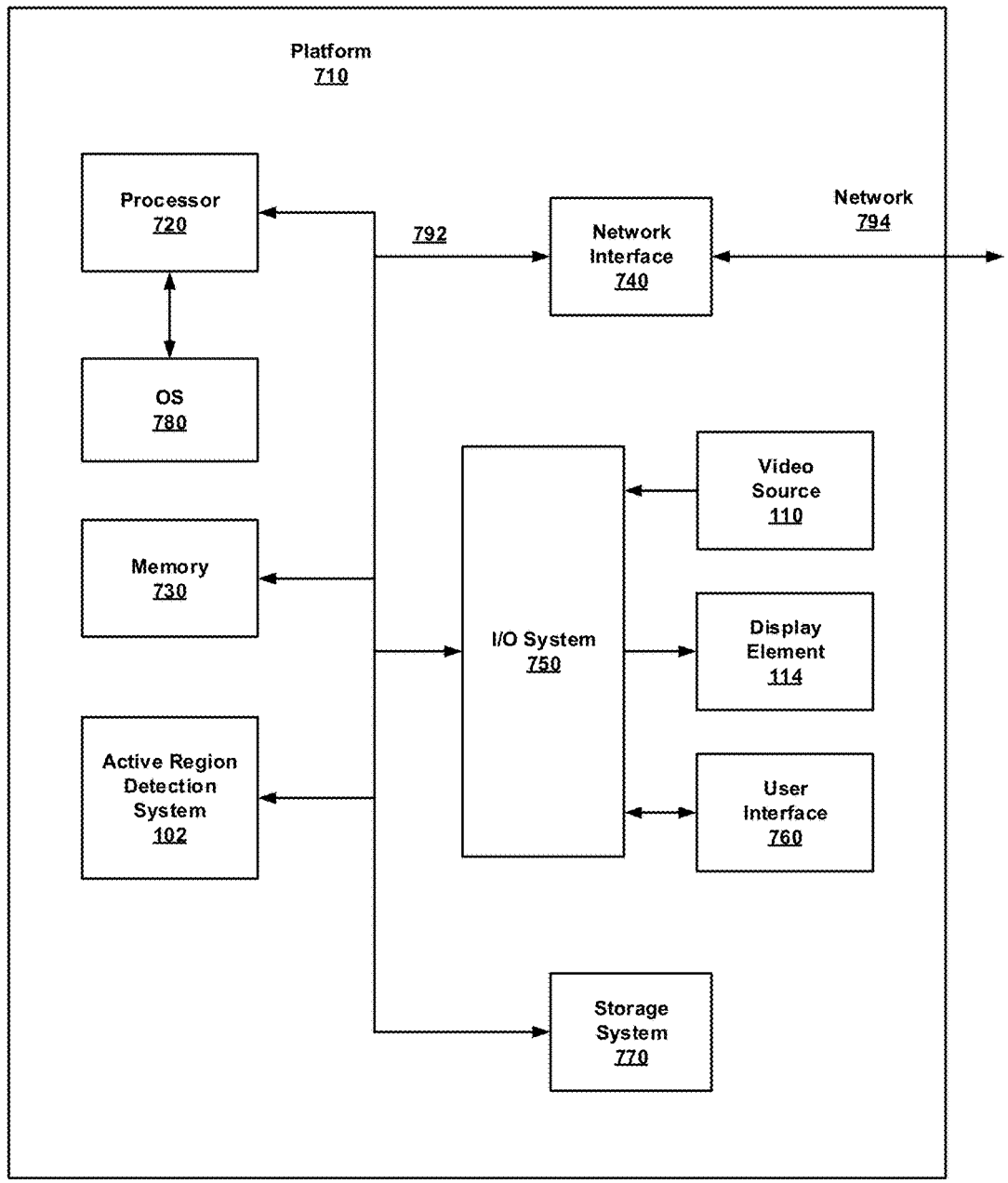
FIG. 7 is a block diagram schematically illustrating a system platform to perform active region detection of video frames, configured in accordance with certain embodiments of the present disclosure.

FIG. 7 illustrates an example system 700 to perform active region detection of video frames, configured in accordance with certain embodiments of the present disclosure. In some embodiments, system 700 comprises a platform 710 which may host, or otherwise be incorporated into a television (TV), a smart TV, a TV receiver/converter, a personal computer, workstation, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, and so forth. Any combination of different devices may be used in certain embodiments.

In some embodiments, platform 710 may comprise any combination of a processor 720, a memory 730, active region detection system 102, a network interface 740, an input/output (I/O) system 750, a video source 110, a display element 114, a user interface 760 and a storage system 770. As can be further seen, a bus and/or interconnect 792 is also provided to allow for communication between the various components listed above and/or other components not shown. Platform 710 can be coupled to a network 794 through network interface 740 to allow for communications with other computing devices, platforms or resources. Other componentry and functionality not reflected in the block diagram of FIG. 7 will be apparent in light of this disclosure, and it will be appreciated that other embodiments are not limited to any particular hardware configuration.

Processor 720 can be any suitable processor, and may include one or more coprocessors or controllers, such as an audio processor or a graphics processing unit, to assist in control and processing operations associated with system 700. In some embodiments, the processor 720 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 720 may be implemented as a complex instruction set computer (CISC) or a reduced instruction set computer (RISC) processor. In some embodiments, processor 720 may be configured as an x86 instruction set compatible processor.

Memory 730 can be implemented using any suitable type of digital storage including, for example, flash memory and/or random access memory (RAM). In some embodiments, the memory 730 may include various layers of memory hierarchy and/or memory caches as are known to those of skill in the art. Memory 730 may be implemented as a volatile memory device such as, but not limited to, a RAM, dynamic RAM (DRAM), or static RAM (SRAM) device. Storage system 770 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 770 may comprise technology to increase the storage performance enhanced protection for valuable digital media when multiple hard drives are included.

Processor 720 may be configured to execute an Operating System (OS) 780 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with system 700, and therefore may also be implemented using any suitable existing or subsequently-developed platform.

Network interface circuit 740 can be any appropriate network chip or chipset which allows for wired and/or wireless connection between other components of computer system 700 and/or network 794, thereby enabling system 700 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 750 may be configured to interface between various I/O devices and other components of computer system 700. I/O devices may include, but not be limited to a video source 110, a display element 114, and other devices not shown such as a keyboard, mouse, microphone, speaker, etc.

I/O system 750 may include a graphics subsystem configured to perform processing of images for display element 114. Graphics subsystem may be a graphics processing unit or a visual processing unit (VPU), for example. An analog or digital interface may be used to communicatively couple graphics subsystem and display element 114. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 720 or any chipset of platform 710. In some embodiments, display element 114 may comprise any television type monitor or display. Display element 114 may comprise, for example, a computer display screen, touchscreen display, video monitor, television-like device, and/or a television. Display element 114 may be digital and/or analog. Under the control of the OS 780 (or one or more software applications), platform 710 may display images on display element 114. The images may be provided by video source 110 and processed in accordance with active region detection results, as described herein.

It will be appreciated that in some embodiments, the various components of the system 700 may be combined or integrated in a system-on-a-chip (SoC) architecture. In some embodiments, the components may be hardware components, firmware components, software components or any suitable combination of hardware, firmware or software.

Active region detection system 102 is configured to detect active regions (e.g., non-static regions) of video image frames. Detection of active regions may allow for the removal of black bars, on the edges of the frames, which can result from conversion between different video formats. Active region detection system 102 may include any or all of the components illustrated in FIG. 4 as described above. Active region detection system 102 can be implemented or otherwise used in conjunction with a variety of suitable software and/or hardware that is coupled to or that otherwise forms a part of platform 710. Active region detection system 102 can additionally or alternatively be implemented or otherwise used in conjunction with user I/O devices that are capable of providing information to, and receiving information and commands from, a user. These I/O devices may include display element 114, and other devices collectively referred to as user interface 760. In some embodiments, user interface 760 may include a textual input device such as a keyboard, and a pointer-based input device such as a mouse. Other input/output devices that may be used in other embodiments include a touchscreen, a touchpad, a speaker, and/or a microphone. Still other input/output devices can be used in other embodiments.

In some embodiments, active region detection system 102 may be installed local to system 700, as shown in the example embodiment of FIG. 7. Alternatively, system 700 can be implemented in a client-server arrangement wherein at least some functionality associated with these circuits is provided to system 700 using an applet, such as a JavaScript applet, or other downloadable module. Such a remotely accessible module or sub-module can be provisioned in real-time, in response to a request from a client computing system for access to a given server having resources that are of interest to the user of the client computing system. In such embodiments the server can be local to network 794 or remotely coupled to network 794 by one or more other networks and/or communication channels. In some cases access to resources on a given network or computing system may require credentials such as usernames, passwords, and/or compliance with any other suitable security mechanism.

In various embodiments, system 700 may be implemented as a wireless system, a wired system, or a combination of both. When implemented as a wireless system, system 700 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 700 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the active region detection methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 794. In other embodiments the functionalities disclosed herein can be incorporated into other software applications, such as video editing applications, video analysis applications, video presentation applications, or other content generation, modification, and/or management applications, including video codec applications. Knowledge of the active region of video frames can be used prior to encoding, or as feedback to the decoder, to provide the same benefits as with general image processing applications, namely avoiding artifacts due to errors in motion estimation, and processing only the pixels of the active region, thus reducing the workload. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 700 may comprise additional, fewer, or alternative subcomponents as compared to those included in the example embodiment of FIG. 7.

The aforementioned non-transitory computer readable medium may be any suitable medium for storing digital information, such as a hard drive, a server, a flash memory, and/or random access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for active region detection in video frames. The method comprises: extracting, by a processor, a plurality of features from rows of pixels and columns of pixels of a current video frame, the features based on horizontal gradient runs (HGRs) and vertical gradient runs (VGRs); detecting, by the processor, one or more static regions of the current video frame, based on a comparison of differences of a subset of the extracted features of the current video frame and extracted features of a previous video frame, to a set of static region detection threshold values; detecting, by the processor, one or more boundaries of the detected static regions based on a location of a maximum value of one of the features within the static region, the maximum value greater than a boundary detection threshold value; and defining, by the processor, an active region in the current video frame based on exclusion of the detected static regions.

Example 2 includes the subject matter of Example 1, further comprising calculating coordinates to define the detected boundaries of the detected static regions, the coordinates identifying top left, bottom left, top right, and bottom right pixels of the detected static regions.

Example 3 includes the subject matter of Examples 1 or 2, wherein the HGR identifies a row grouping of consecutive pixels for which a difference in luminance between each pair of adjacent pixels of the row grouping exceeds a delta luminance threshold; and the VGR identifies a column grouping of consecutive pixels for which a difference in luminance between each pair of adjacent pixels of the column grouping exceeds the delta luminance threshold.

Example 4 includes the subject matter of any of Examples 1-3, wherein the features comprise a count of the number of HGRs and the number of VGRs for each of the rows of pixels and for each of the columns of pixels.

Example 5 includes the subject matter of any of Examples 1-4, wherein the maximum value of one of the features is the maximum of the counts of the number of HGRs and the maximum of the counts of the number of VGRs.

Example 6 includes the subject matter of any of Examples 1-5, wherein the features comprise a summation of locations of starting points of the HGRs for each of the rows and a summation of locations of starting points of the VGRs for each of the columns.

Example 7 includes the subject matter of any of Examples 1-6, wherein the features comprise an average of luminance value of pixels in each of the rows and an average of luminance value of pixels in each of the columns.

Example 8 includes the subject matter of any of Examples 1-7, further comprising, in response to a failure of the boundary detection in the current video frame and a success of the boundary detection in the previous video frame: calculating a first average of red, green, and blue (RGB) values of pixels within the static region boundary of the previous video frame; calculating a second average of RGB values of pixels within a region of the current video frame that corresponds to the static region boundary of the previous video frame; and assigning the static region boundary of the previous video frame to the current video frame, if the difference between the first average and the second average is less than an RGB threshold.

Example 9 is a system for active region detection in videos. The system comprises: a feature extraction circuit to extract a plurality of features from rows of pixels and columns of pixels of a current video frame, the features based on horizontal gradient runs (HGRs) and vertical gradient runs (VGRs); a static region detection circuit to detect one or more static regions of the current video frame, based on a comparison of differences of a subset of the extracted features of the current video frame and extracted features of a previous video frame, to a set of static region detection threshold values; a boundary detection circuit to detect one or more boundaries of the detected static regions based on a location of a maximum value of one of the features within the static region, the maximum value greater than a boundary detection threshold value; and a coordinate calculation circuit to define an active region in the current video frame based on exclusion of the detected static regions.

Example 10 includes the subject matter of Example 9, wherein the coordinate calculation circuit is further to calculate coordinates to define the detected boundaries of the detected static regions, the coordinates identifying top left, bottom left, top right, and bottom right pixels of the detected static regions.

Example 11 includes the subject matter of Examples 9 or 10, wherein the HGR identifies a row grouping of consecutive pixels for which a difference in luminance between each pair of adjacent pixels of the row grouping exceeds a delta luminance threshold; and the VGR identifies a column grouping of consecutive pixels for which a difference in luminance between each pair of adjacent pixels of the column grouping exceeds the delta luminance threshold.

Example 12 includes the subject matter of any of Examples 9-11, wherein the features comprise a count of the number of HGRs and the number of VGRs for each of the rows of pixels and for each of the columns of pixels.

Example 13 includes the subject matter of any of Examples 9-12, wherein the maximum value of one of the features is the maximum of the counts of the number of HGRs and the maximum of the counts of the number of VGRs.

Example 14 includes the subject matter of any of Examples 9-13, wherein the features comprise a summation of locations of starting points of the HGRs for each of the rows and a summation of locations of starting points of the VGRs for each of the columns.

Example 15 includes the subject matter of any of Examples 9-14, wherein the features comprise an average of luminance value of pixels in each of the rows and an average of luminance value of pixels in each of the columns.

Example 16 includes the subject matter of any of Examples 9-15, further comprising a temporal consistency circuit to, in response to a failure of the boundary detection in the current video frame and a success of the boundary detection in the previous video frame: calculate a first average of red, green, and blue (RGB) values of pixels within the static region boundary of the previous video frame; calculate a second average of RGB values of pixels within a region of the current video frame that corresponds to the static region boundary of the previous video frame; and assign the static region boundary of the previous video frame to the current video frame, if the difference between the first average and the second average is less than an RGB threshold.

Example 17 is at least one non-transitory computer readable storage medium having instructions encoded thereon that, when executed by one or more processors, result in the following operations for active region detection in videos. The operations comprise: extracting a plurality of features from rows of pixels and columns of pixels of a current video frame, the features based on horizontal gradient runs (HGRs) and vertical gradient runs (VGRs); detecting one or more static regions of the current video frame, based on a comparison of differences of a subset of the extracted features of the current video frame and extracted features of a previous video frame, to a set of static region detection threshold values; detecting one or more boundaries of the detected static regions based on a location of a maximum value of one of the features within the static region, the maximum value greater than a boundary detection threshold value; and defining an active region in the current video frame based on exclusion of the detected static regions.

Example 18 includes the subject matter of Example 17, the operations further comprising calculating coordinates to define the detected boundaries of the detected static regions, the coordinates identifying top left, bottom left, top right, and bottom right pixels of the detected static regions.

Example 19 includes the subject matter of Examples 17 or 18, wherein the HGR identifies a row grouping of consecutive pixels for which a difference in luminance between each pair of adjacent pixels of the row grouping exceeds a delta luminance threshold; and the VGR identifies a column grouping of consecutive pixels for which a difference in luminance between each pair of adjacent pixels of the column grouping exceeds the delta luminance threshold.

Example 20 includes the subject matter of any of Examples 17-19, wherein the features comprise a count of the number of HGRs and the number of VGRs for each of the rows of pixels and for each of the columns of pixels.

Example 21 includes the subject matter of any of Examples 17-20, wherein the maximum value of one of the features is the maximum of the counts of the number of HGRs and the maximum of the counts of the number of VGRs.

Example 22 includes the subject matter of any of Examples 17-21, wherein the features comprise a summation of locations of starting points of the HGRs for each of the rows and a summation of locations of starting points of the VGRs for each of the columns.

Example 23 includes the subject matter of any of Examples 17-22, wherein the features comprise an average of luminance value of pixels in each of the rows and an average of luminance value of pixels in each of the columns.

Example 24 includes the subject matter of any of Examples 17-23, the operations further comprising, in response to a failure of the boundary detection in the current video frame and a success of the boundary detection in the previous video frame: calculating a first average of red, green, and blue (RGB) values of pixels within the static region boundary of the previous video frame; calculating a second average of RGB values of pixels within a region of the current video frame that corresponds to the static region boundary of the previous video frame; and assigning the static region boundary of the previous video frame to the current video frame, if the difference between the first average and the second average is less than an RGB threshold.

Example 25 is a system for active region detection in video frames. The system comprises: means for extracting a plurality of features from rows of pixels and columns of pixels of a current video frame, the features based on horizontal gradient runs (HGRs) and vertical gradient runs (VGRs); means for detecting one or more static regions of the current video frame, based on a comparison of differences of a subset of the extracted features of the current video frame and extracted features of a previous video frame, to a set of static region detection threshold values; means for detecting one or more boundaries of the detected static regions based on a location of a maximum value of one of the features within the static region, the maximum value greater than a boundary detection threshold value; and means for defining an active region in the current video frame based on exclusion of the detected static regions.

Example 26 includes the subject matter of Example 25, further comprising means for calculating coordinates to define the detected boundaries of the detected static regions, the coordinates identifying top left, bottom left, top right, and bottom right pixels of the detected static regions.

Example 27 includes the subject matter of Examples 25 or 26, wherein the HGR identifies a row grouping of consecutive pixels for which a difference in luminance between each pair of adjacent pixels of the row grouping exceeds a delta luminance threshold; and the VGR identifies a column grouping of consecutive pixels for which a difference in luminance between each pair of adjacent pixels of the column grouping exceeds the delta luminance threshold.

Example 28 includes the subject matter of any of Examples 25-27, wherein the features comprise a count of the number of HGRs and the number of VGRs for each of the rows of pixels and for each of the columns of pixels.

Example 29 includes the subject matter of any of Examples 25-28, wherein the maximum value of one of the features is the maximum of the counts of the number of HGRs and the maximum of the counts of the number of VGRs.

Example 30 includes the subject matter of any of Examples 25-29, wherein the features comprise a summation of locations of starting points of the HGRs for each of the rows and a summation of locations of starting points of the VGRs for each of the columns.

Example 31 includes the subject matter of any of Examples 25-30, wherein the features comprise an average of luminance value of pixels in each of the rows and an average of luminance value of pixels in each of the columns.

Example 32 includes the subject matter of any of Examples 25-31, further comprising, in response to a failure of the boundary detection in the current video frame and a success of the boundary detection in the previous video frame: means for calculating a first average of red, green, and blue (RGB) values of pixels within the static region boundary of the previous video frame; means for calculating a second average of RGB values of pixels within a region of the current video frame that corresponds to the static region boundary of the previous video frame; and means for assigning the static region boundary of the previous video frame to the current video frame, if the difference between the first average and the second average is less than an RGB threshold.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for active region detection in video frames, the method comprising:
   extracting, by a processor, a plurality of features from rows of pixels and columns of pixels of a current video frame, the features based on horizontal gradient runs (HGRs) and vertical gradient runs (VGRs), wherein the features comprise a summation of locations of starting points of the HGRs for each of the rows of the current video frame and a summation of locations of starting points of the VGRs for each of the columns of the current video frame;
   detecting, by the processor, one or more static regions of the current video frame, based on a comparison of differences of a subset of the extracted features of the current video frame and extracted features of a previous video frame, to a set of static region detection threshold values;
   detecting, by the processor, one or more boundaries of the detected static regions based on a location of a maximum value of one of the features within the static region, the maximum value greater than a boundary detection threshold value; and
   defining, by the processor, an active region in the current video frame based on exclusion of the detected static regions.

2. The method of claim 1, further comprising calculating coordinates to define the detected boundaries of the detected static regions, the coordinates identifying top left, bottom left, top right, and bottom right pixels of the detected static regions.

3. The method of claim 1, wherein the HGR identifies a row grouping of consecutive pixels for which a difference in luminance between each pair of adjacent pixels of the row grouping exceeds a delta luminance threshold; and the VGR identifies a column grouping of consecutive pixels for which a difference in luminance between each pair of adjacent pixels of the column grouping exceeds the delta luminance threshold.

4. The method of claim 1, wherein the features comprise a count of the number of HGRs and the number of VGRs for each of the rows of pixels and for each of the columns of pixels.

5. The method of claim 4, wherein the maximum value of one of the features is the maximum of the counts of the number of HGRs and the maximum of the counts of the number of VGRs.

6. The method of claim 1, wherein the features comprise an average of luminance value of pixels in each of the rows and an average of luminance value of pixels in each of the columns.

7. The method of claim 1, further comprising, in response to a failure of the boundary detection in the current video frame and a success of the boundary detection in the previous video frame:
   calculating a first average of red, green, and blue (RGB) values of pixels within the static region boundary of the previous video frame;
   calculating a second average of RGB values of pixels within a region of the current video frame that corresponds to the static region boundary of the previous video frame; and
   assigning the static region boundary of the previous video frame to the current video frame, if the difference between the first average and the second average is less than an RGB threshold.

8. A system for active region detection in videos, the system comprising:
   a feature extraction circuit to extract a plurality of features from rows of pixels and columns of pixels of a current video frame, the features based on horizontal gradient runs (HGRs) and vertical gradient runs (VGRs), wherein the features comprise a summation of locations of starting points of the HGRs for each of the rows of the current video frame and a summation of locations of starting points of the VGRs for each of the columns of the current video frame;
   a static region detection circuit to detect one or more static regions of the current video frame, based on a comparison of differences of a subset of the extracted features of the current video frame and extracted features of a previous video frame, to a set of static region detection threshold values;
   a boundary detection circuit to detect one or more boundaries of the detected static regions based on a location of a maximum value of one of the features within the static region, the maximum value greater than a boundary detection threshold value; and
   a coordinate calculation circuit to define an active region in the current video frame based on exclusion of the detected static regions.

9. The system of claim 8, wherein the coordinate calculation circuit is further to calculate coordinates to define the detected boundaries of the detected static regions, the coordinates identifying top left, bottom left, top right, and bottom right pixels of the detected static regions.

10. The system of claim 8, wherein the HGR identifies a row grouping of consecutive pixels for which a difference in luminance between each pair of adjacent pixels of the row grouping exceeds a delta luminance threshold; and the VGR identifies a column grouping of consecutive pixels for which a difference in luminance between each pair of adjacent pixels of the column grouping exceeds the delta luminance threshold.

11. The system of claim 8, wherein the features comprise a count of the number of HGRs and the number of VGRs for each of the rows of pixels and for each of the columns of pixels.

12. The system of claim 11, wherein the maximum value of one of the features is the maximum of the counts of the number of HGRs and the maximum of the counts of the number of VGRs.

13. The system of claim 8, wherein the features comprise an average of luminance value of pixels in each of the rows and an average of luminance value of pixels in each of the columns.

14. The system of claim 8, further comprising a temporal consistency circuit to, in response to a failure of the boundary detection in the current video frame and a success of the boundary detection in the previous video frame:
calculate a first average of red, green, and blue (RGB) values of pixels within the static region boundary of the previous video frame;
calculate a second average of RGB values of pixels within a region of the current video frame that corresponds to the static region boundary of the previous video frame; and
assign the static region boundary of the previous video frame to the current video frame, if the difference between the first average and the second average is less than an RGB threshold.

15. At least one non-transitory computer readable storage medium having instructions encoded thereon that, when executed by one or more processors, result in the following operations for active region detection in videos, the operations comprising:
extracting a plurality of features from rows of pixels and columns of pixels of a current video frame, the features based on horizontal gradient runs (HGRs) and vertical gradient runs (VGRs), wherein the features comprise a summation of locations of starting points of the HGRs for each of the rows of the current video frame and a summation of locations of starting points of the VGRs for each of the columns of the current video frame;
detecting one or more static regions of the current video frame, based on a comparison of differences of a subset of the extracted features of the current video frame and extracted features of a previous video frame, to a set of static region detection threshold values;
detecting one or more boundaries of the detected static regions based on a location of a maximum value of one of the features within the static region, the maximum value greater than a boundary detection threshold value; and
defining an active region in the current video frame based on exclusion of the detected static regions.

16. The computer readable storage medium of claim 15, the operations further comprising calculating coordinates to define the detected boundaries of the detected static regions, the coordinates identifying top left, bottom left, top right, and bottom right pixels of the detected static regions.

17. The computer readable storage medium of claim 15, wherein the HGR identifies a row grouping of consecutive pixels for which a difference in luminance between each pair of adjacent pixels of the row grouping exceeds a delta luminance threshold; and the VGR identifies a column grouping of consecutive pixels for which a difference in luminance between each pair of adjacent pixels of the column grouping exceeds the delta luminance threshold.

18. The computer readable storage medium of claim 15, wherein the features comprise a count of the number of HGRs and the number of VGRs for each of the rows of pixels and for each of the columns of pixels.

19. The computer readable storage medium of claim 18, wherein the maximum value of one of the features is the maximum of the counts of the number of HGRs and the maximum of the counts of the number of VGRs.

20. The computer readable storage medium of claim 15, wherein the features comprise an average of luminance value of pixels in each of the rows and an average of luminance value of pixels in each of the columns.

21. The computer readable storage medium of claim 15, the operations further comprising, in response to a failure of the boundary detection in the current video frame and a success of the boundary detection in the previous video frame:
calculating a first average of red, green, and blue (RGB) values of pixels within the static region boundary of the previous video frame;
calculating a second average of RGB values of pixels within a region of the current video frame that corresponds to the static region boundary of the previous video frame; and
assigning the static region boundary of the previous video frame to the current video frame, if the difference between the first average and the second average is less than an RGB threshold.

* * * * *